United States Patent
Falk

[15] 3,644,815
[45] Feb. 22, 1972

[54] DIGITAL P.I. SERVOCONTROL SYSTEM

[72] Inventor: Ronald E. Falk, Bristol, Conn.

[73] Assignee: Chandler Evans, Inc., West Hartford, Conn.

[22] Filed: Nov. 10, 1969

[21] Appl. No.: 875,463

[52] U.S. Cl. ............................318/609, 318/603, 318/685
[51] Int. Cl. ................................................G05b 11/36
[58] Field of Search ..................318/132, 609, 610, 603, 685

[56] References Cited

UNITED STATES PATENTS

| | | | |
|---|---|---|---|
| 3,391,316 | 7/1968 | Ross | 318/20.390 |
| 3,466,517 | 9/1969 | Leenhouts | 318/138 X |
| 2,666,171 | 1/1954 | Williams, Jr. et al. | 318/610 |
| 2,946,943 | 7/1960 | Nye et al. | 318/610 X |
| 3,427,442 | 2/1969 | Sklaroff | 318/609 X |
| 3,464,438 | 9/1969 | Maurer | 318/609 X |
| 3,532,956 | 10/1970 | Simon | 318/609 |

OTHER PUBLICATIONS

Thaler & Brown, "Servomechanism Analysis," McGraw-Hill, 1953, pp. 103-105, Topic A-20.

*Primary Examiner*—T. E. Lynch
*Attorney*—Fishman and Van Kirk

[57] ABSTRACT

A digital servosystem having an integral path. The integral path includes a portion of the proportional step motor control circuitry and includes means for providing low-frequency control pulses to the motor at a rate which is a function of the proportional position of the actuator being controlled.

8 Claims, 2 Drawing Figures

DIGITAL P.I. SERVOCONTROL SYSTEM

BACKGROUND OF THE INVENTION

1. Field of the Invention

The present invention relates to the positioning of movable members. More specifically, the present invention is directed to a digital proportional servosystem having a supplementary integral path. Accordingly, the general objects of the present invention are to provide novel and improved methods and apparatus of such character.

2. Description of the Prior Art

While not limited thereto in its utility, the present invention is particularly well suited for use in open-loop systems. For a discussion of digital open-loop servosystems in general, and a detailed description of a proportional control system with which the present invention may be utilized, reference may be had to copending application Ser. No. 836,122 entitled "Digital Proportional Servosystem" filed June 24, 1969 by Edward F. Gebelein, now U.S. Pat. No. 3,593,097, and assigned to the assignee of the present invention. The disclosure of said U.S. Pat. No. 3,593,097 issued July 13, 1971 is hereby incorporated herein by reference.

One of the limitations of any purely proportional control system is the necessary presence of some residual control variable error. Thus, considering the example of a proportional servosystem employed to position a fuel metering valve in a helicopter gas turbine engine control system, the proportional control will inherently leave some speed error (engine speed being the control variable) because the position the control is seeking is equal to the control variable error multiplied by the gain of the system. The amount of this residual error is proportional to the position of the metering valve on the droop curve of the engine and its control. While it is theoretically possible to make system gain sufficiently high to approximate a straight droop curve and to thereby practically eliminate the residual speed error, in practice the control system becomes unstable if the gain is too high. Thus, for example, control system oscillation is likely to result from gain which is too high coupled with transient load changes on the engine such as are caused by wind buffeting.

A standard approach to overcoming the above briefly discussed limitations of proportional controls is the addition of a parallel integral loop. Operating alone, an integral control system will either be characterized by slow response or, if system response in increased, overshoot and hunting.

While digital servosystems including an integral path have previously been proposed, such prior art systems have been unduly complex from the standpoint of circuitry and have thus tended to be unreliable. For example, the addition of an integral path to a proportional step motor control in a manner whereby a portion of the proportional control circuitry was included in the integral path was not previously possible.

SUMMARY OF THE INVENTION

The present invention overcomes the above discussed and other disadvantages of the prior art and in so doing provides a novel and improved digital control system. The system of the present invention is characterized by the delivery of integral control pulses, at a rate which is proportional to a new position dictated by a proportional control, to an actuator simultaneously with the delivery of a digital signal proportional to the magnitude of the control error to the actuator. The proportional and integral signals are transmitted to the actuator until such time as the control variable error has been nulled by means of rescheduling a parameter responsive to the position of the actuator to establish a condition which maintains the control variable at the proper level.

In achieving the foregoing, in accordance with the present invention, digital signals commensurate with the control variable error are serially loaded into a command counter. In the command counter, the magnitude of each control variable error signal is compared with a number previously stored in a second or position counter in order to determine the magnitude of the signal which must be sent to the actuator being controlled in order to null the control variable error. Control signals sent to the actuator are also fed back to the position counter. Accordingly, the magnitude of the number stored in the position counter is commensurate with a new position of the actuator and thus indicative of control variable error; the actuator position, position counter count and control variable error all being equal at equilibrium. Integrator action is achieved by employing the position counter, or more precisely the count stored therein, to control an integral logic circuit. The integral logic circuit transmits pulses to the actuator at a rate which is a function of the number in the position counter. The pulses are delivered to the actuator in addition to the proportional pulses delivered to thereto as a result of the comparison of the numbers stored in the command and position counters.

The integral logic circuit of the present invention comprises frequency divider circuitry which is typically responsive to the output of the source of proportional pulses. The frequency divider circuit provides a plurality of output signals at lower frequencies and shifted in phase with respect to the proportional pulses, each of the output signals being constrained to a narrow enough pulse width to permit interleaving of the pulses at the various low frequencies. The phase shaft also permits the low-frequency pulses to be interleaved between proportional pulses. The integral logic circuit of the present invention further comprises gating circuitry which is responsive to the count stored in the position counter whereby the frequency of the signal or signals transmitted to the actuator in addition to the proportional pulses will be commensurate with the control variable error.

BRIEF DESCRIPTION OF THE DRAWING

The present invention may be better understood and its numerous objects and advantages will become apparent to those skilled in the art by reference to the accompanying drawing wherein.

DESCRIPTION OF THE PREFERRED EMBODIMENT

Figure 1:
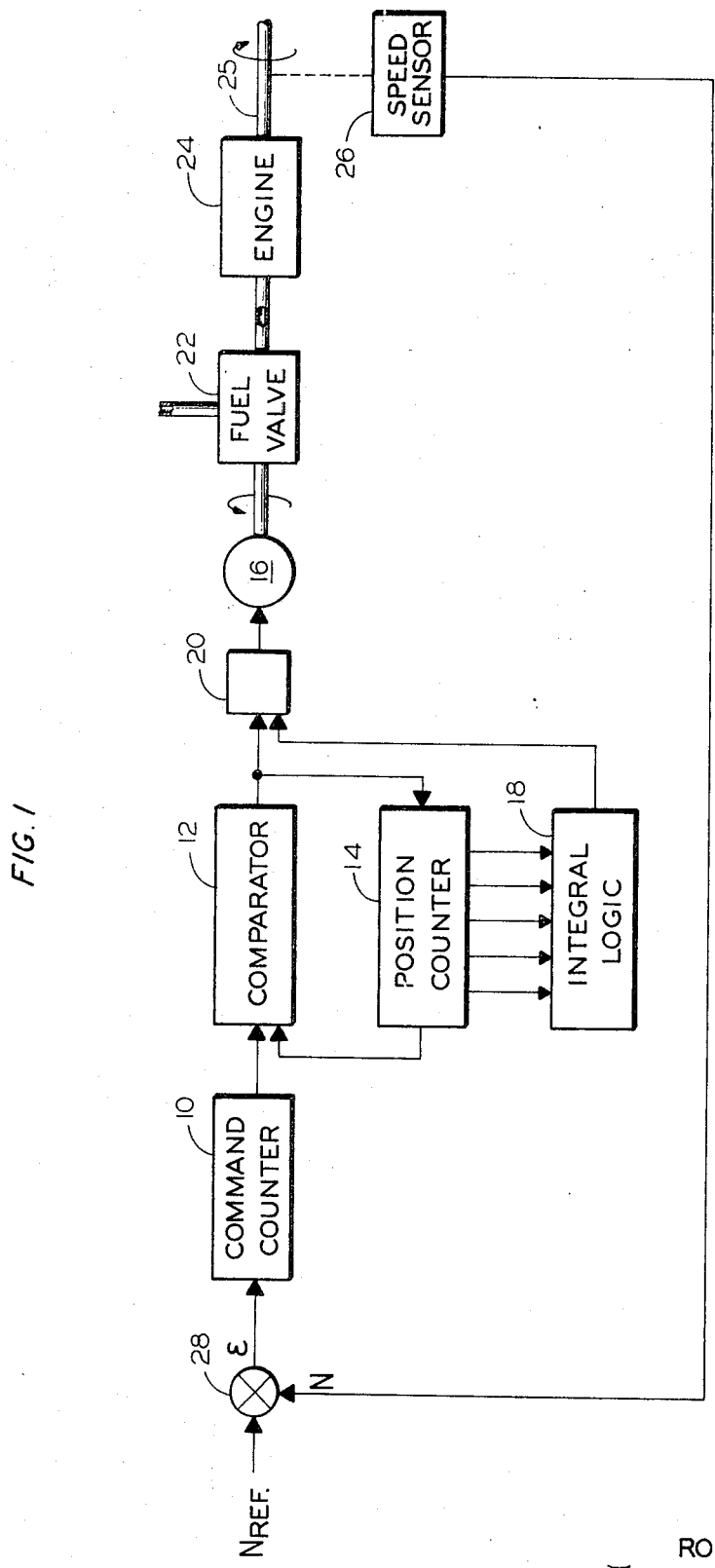
FIG. 1 is a functional block diagram of the present invention in the environment of a fuel control for a gas turbine engine.

With reference now to FIG. 1, the mode of deriving integral action from a proportional step motor servo in accordance with the present invention is depicted. In FIG. 1, a digital signal commensurate with control variable error $\epsilon$ is loaded into a command counter 10. The number loaded into counter 10 is compared, in a comparator 12, with the magnitude of the number stored in a position counter 14. The purpose of the comparison is to determine the number of pulses or steps which must be sent to a step motor 16, which comprises the actuator or mechanism being controlled, to reduce the control variable error to the extent possible within the capabilities of the proportional system. The proportional control signal resulting from the comparison is delivered to motor 16 via a summing gate 20 and is also fed back to position counter 14. As will become obvious from the description to follow, in the absence of a control variable error input signal, the position counter 14 will be at an equilibrium position which would typically be with zero counts stored therein.

Implementation of supplementary integral action in accordance with the present invention relies upon the fact that the magnitude of the number in position counter 14 is representative of control variable error $\epsilon$. Integral action is achieved through the use of integral logic circuit 18 which provides an output signal or signals in the form of pulses at lower frequencies than the frequency of the proportional pulses being transmitted to motor 16 from comparator 12. Under the control of gating circuitry, which will be described in more detail below, an integral logic circuit output signal commensurate with the number stored in position counter 14 will be delivered via gating circuit 20 to the step motor 16.

Considering the control variable to be the speed of a mechanism responsive to motor 16 output shaft position, it may be seen that the proportional pulses counted by position counter 14 will be commensurate with control variable error $\epsilon$ and also with the position of the motor. Accordingly, the low-frequency signals gated from integral logic circuit 18 as a result of the state of position counter 14 will be a function of motor position and thus will be commensurate with speed error. The integral pulses will remove the residual error of the proportional system and, in so doing, will achieve zero steady state control variable (speed) error. Considering the fuel control environment shown in FIG. 1, the output shaft of stepping motor 16 is coupled to a fuel metering valve 22 which is employed to regulate the rate $W_f$ at which fuel is delivered to a gas generator 24. Gas generator 24 may, for example, be a state-of-the-art free turbine-type engine. The actual speed of the output shaft 25 of engine 24 will be sensed by a speed sensor 26, typically a conventional tachometer, and a tachometer output signal commensurate with actual speed N will be compared, in a summing circuit 28, with a signal commensurate with the desired speed $N_{REF}$. The output of the summing or comparator circuit 28 is the speed or control variable error signal $\epsilon$ which is delivered to command counter 10.

Figure 2:
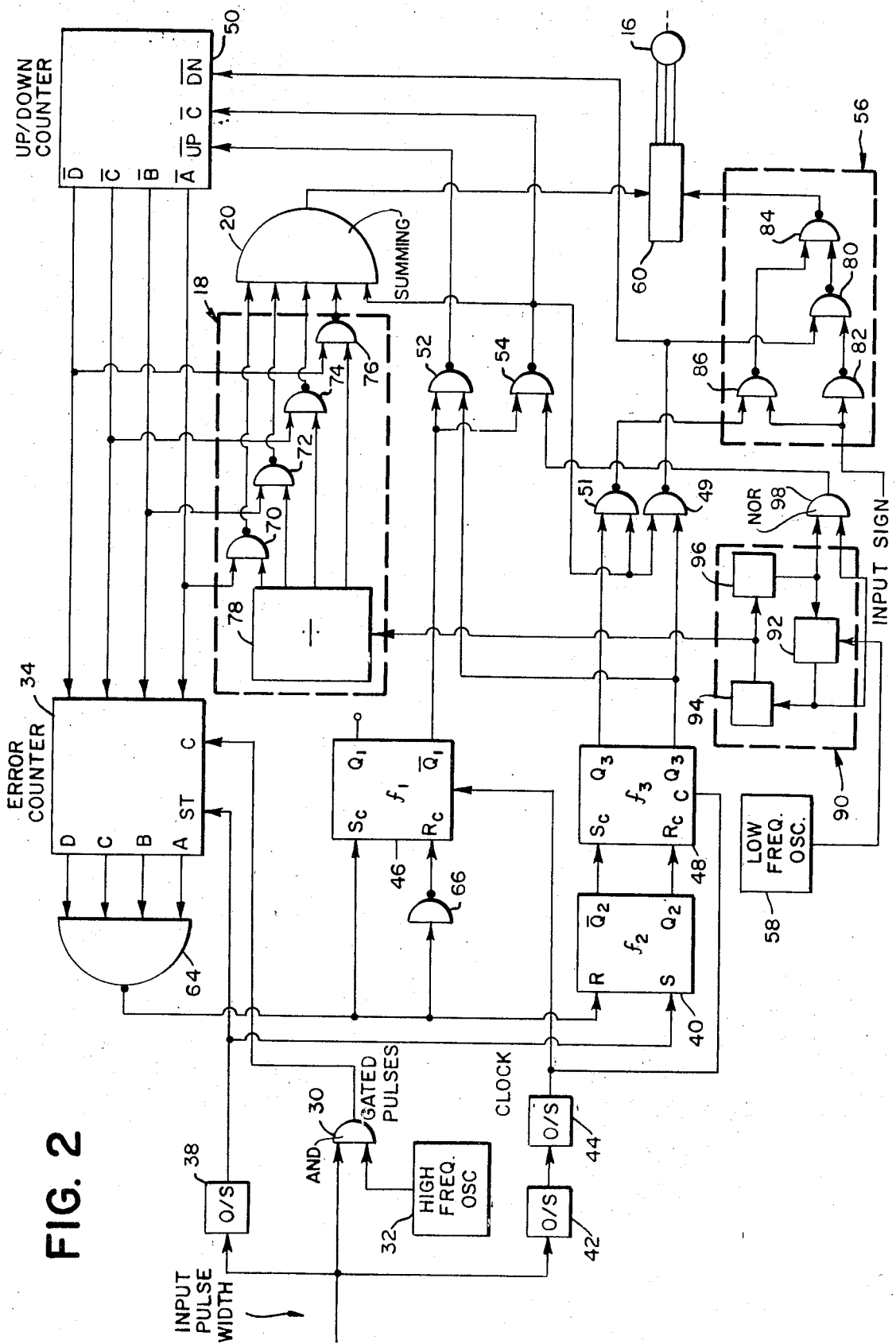
FIG. 2 is a block diagram depicting a preferred embodiment of the present invention incorporated in an open-loop digital servosystem.

With reference now to FIG. 2, consideration will be given to a preferred embodiment of the present invention as incorporated in an open-loop digital servosystem. In the interest of understanding the invention, the system of FIG. 2 may be considered as being employed to control a fuel metering valve of a gas turbine engine, such valve being operatively connected to the output shaft of actuator (step motor) 16. Considering the environment of a fuel control for a gas turbine engine installed on a helicopter, the object of the control system is to maintain, by means of regulating fuel flow, engine speed at a constant level regardless of load changes. The position system may be considered as an open-loop servocontrol in that the actual position of the control element within the fuel metering valve cannot practically be sensed and therefore the valve control must synthesize valve position as executed by a proportional control. The principal control parameter or control variable will be engine speed and engine input to the servocontrol of FIG. 2 will be a pulse width modulated signal commensurate with actual speed (control variable) error. This signal commensurate with speed error will hereinafter be referred to as the control variable error signal and engine speed will be referred to as the control variable.

The circuitry depicted in FIG. 2 synthesizes a position signal, as represented by the position of the output shaft of step motor 16, which is commensurate with valve position as executed by a proportional control. The proportional control cannot completely eliminate the control variable error and, accordingly, an integral term or path is included in the system in the interest of long term or steady state speed correction. Thus, the present invention incorporates an integral path in a proportional step motor servo in order to provide for speed correction and to reestablish a long term or steady state fuel flow which is sufficient to null the engine speed error. Again considering the environment of a helicopter gas turbine engine speed control, which attempts to achieve isochronous governing, each load change results in the generation of a control variable error signal. Under the command of the proportional servo portion of the control of FIG. 2, the step motor 16 will be rapidly repositioned to null speed error within the capabilities of the proportional control. Thereafter the integral logic circuitry of the present invention, which provides a signal at a rate commensurate with the change in step motor position, will operate to reestablish the long term fuel flow which is sufficient to null the control variable error as established by the selection of a new engine load.

Input pulses having width commensurate with the control variable error are applied as gating signals to an AND-gate 30. Square wave pulses provided by a high frequency oscillator 32 are also applied to gate 30. The number of oscillator 32 output pulses passed by gate 30 will be commensurate with the width of the received input pulse which enables gate 30. These gated pulses, which may be indicative of a control variable error or, more precisely, a need to reposition the mechanism being controlled by the present invention, are applied to an error counter 34. Error counter 34 may comprise a parallel loading "up counter" such as, for example, a Signetics Corporation Model 8281 binary counter with parallel entry. Error counter 34, as will become apparent from the discussion below, performs the functions of command counter 10 and comparator 12 of FIG. 1.

The input or error pulses are also applied to a monostable multivibrator 38. Multivibrator 38 provides strobe and synchronization pulses which are transmitted to error counter 34. The strobe pulses from multivibrator 38 are also applied as one input to a one bit memory circuit comprising an RST mutivibrator circuit 40. As will be described in greater detail below, multivibrator 38 is set by the leading edge of an input pulse.

The input pulses are also applied to a clock circuit comprising cascade connected one shot multivibrators 42 and 44. Multivibrator 44, which functions as a delay circuit, is set by the trailing edge of each input pulse and, in turn, clock multivibrator 44 will be set by the trailing edge of pulses provided by multivibrator 42. Accordingly, multivibrator 44 provides delayed clock pulses which are applied to RST multivibrators 46 and 48 for the purposes to be explained below. The RST multivibrators 46 and 48 may be Signetics-Type SE 8424 while RST flip-flop 40 may be Signetics-Type ST 8824.

As will become obvious from the description to follow, digital information commensurate with both the control variable error and the change in position of motor 16 as executed by the proportion control will be loaded into an up-down counter 50 shortly after receipt of the first input pulse commensurate with a control variable error. Counter 50 performs the function of position counter 14 of FIG. 1 and may, for example, be a serial entry up-down counter with limited capacity such as Sylvania Electric Products Type SM-180. The $\overline{Q}$ output of multivibrator 46 is applied, via a NAND-gate 52 to the "up" count input of counter 50. In addition to being connected to a first input of gate 52, the $\overline{Q}$ output of multivibrator 46 is also applied to a first input of NAND-gate 54. The $\overline{Q}$ output of multivibrator 48 is connected, via a gate circuit 49, to the "down" count input of up-down counter 50 and to a first control input of a logic circuit indicated generally at 56. In addition, the $\overline{Q}$ output of multivibrator 48 is connected to the other input of NAND-gate 52.

A low-frequency oscillator 58 provides square wave pulses which are applied to a ring counter, indicated generally at 90, comprised of multivibrator stages 92, 94 and 96. Two stages of counter 90 are connected to a NOR-gate 98 and the output of gate 98 is connected to the second input of NAND-gate 54. Presuming the output of oscillator 58 to be at 384 c.p.s., the pulses applied to gate 54 will be at 256 c.p.s. The pulses applied to gate 54 will comprise the proportional pulses which, in the manner to be described below, will be applied to step motor 16 in order to cause the rapid nulling of control variable error input signals. The third stage 94 of ring counter 90 is connected to the input of a frequency divider circuit 78 in integral logic circuit 18. The input to the integral logic circuit will, in the example being described, be at 128 c.p.s. and the pulses applied to the frequency division circuit 78 will be displaced in phase from the pulses applied to gate circuit 54.

As will be described in detail below, the application of a zero ($\overline{Q}$) signal to gate 54 from multivibrator 46 will enable gate 54 whereby the proportional pulses at 256 c.p.s. will be passed. Thus, upon enabling of gate 54, proportional pulses at two-thirds the output frequency of oscillator 58 will be applied to both the "count" input of up-down counter 50 and, via gating circuit 20, to a translator 60 and thence to step motor 16. Translator 60 is a state-of-the-art device which converts input signals in the form of a pulse train to a three-phase AC signal for driving motor 16.

It is to be noted that both the Q and $\bar{Q}$ outputs of RST multivibrator 48 are applied, respectively via gates 49 and 51, to logic circuit 56 and the output of the logic circuit 56 is also applied to translator 60. As will be described below, logic circuit 56 comprises four NAND gates which either pass or invert an input signal commensurate with the sign of the control variable (speed) error signal. The input signal commensurate with the sign of the error is provided by circuitry which is well known in the art and which does not comprise a part of the present invention.

The stages of up-down counter 50 are connected, via gating circuitry which forms a part of error counter 34, to corresponding stages of the error counter. In addition, at least several stages of up-down counter 50 are connected to gating circuitry which comprises part of the integral logic circuit 18. All of the stages of error counter 34, only four stages being shown for purposes of illustration, are in turn connected as inputs to a NAND-gate 64. Accordingly, the last pulse which fills error counter 34 will cause NAND-gate 64 to go to zero, a "one" signal appearing at the output of gate 64 at all other times. The output of gate 64 is directly connected to the set input of RST-multivibrator 46 and to the reset input of one bit memory circuit 40. In addition, the output of gate 64 is also connected, via a further NAND-gate 66, to the reset input of multivibrator 46. The proportional circuit of the disclosed embodiment of the present invention is completed by connection of the Q and the $\bar{Q}$ outputs of circuit 40 respectively to the reset and set inputs of RST-multivibrator 48.

The integral logic portion 18 of the disclosed embodiment comprises, in addition to frequency divider 78, NAND-gates 70, 72, 74 and 76 which, as noted above, have their control inputs connected to respective stages of up-down counter 50. Signals at different frequencies are applied to the other inputs of gates 70, 72, 74 and 76 by frequency divider circuit 78. Frequency divider circuit 78, which may be a binary divider of a type well known in the art comprising bistable multivibrators and gates, divides down the 128 c.p.s. signal received from the ring counter 90. Frequency divider 78 thus generates lower frequencies in binary order and thereby provides a plurality of output pulse trains at different frequencies; pulses of each of said pulse trains being constrained by the gates in circuit 78 to a narrow enough pulse width to permit interleaving of pulses at the different output frequencies of divider 78. As previously noted, all of the pulses at varying frequencies provided at the output of frequency divider 78 are displaced in phase from the pulses comprising the signal delivered to gate 54 whereby the output pulses from the integral logic circuit 18 may be interleaved between pairs of proportional pulses from gate 54.

Depending upon the instantaneous count stored in up-down counter 50, one or more of gates 70, 72, 74 and 76 may be enabled and, upon receipt of pulse trains from frequency divider 78, the thus enabled gates will pass pulses to summing gate 20. The integral logic circuit output pulses, as well as the proportional pulses from gate 54, will be passed by gate 20 and will be applied to translator circuit 60. It is especially to be noted that the pulses from the integral logic circuit are not applied to and totalized by up-down counter 50.

In operation, input pulses applied to one shot multivibrator 38 will cause the generation of strobe and synchronization pulses by driving the output of multivibrator 38 momentarily to zero. Application of a strobe pulse to the strobe (ST) input of error counter 34 will clear counter 34 and transfer the compliment of the count stored in up-down counter 50 into error counter 54. As will be described below, counter 50 will be empty both initially and when the control variable error has been reduced to zero. The leading edge of the input pulse will also cause the enabling of gate 30 whereby a group of pulses will be delivered from high frequency oscillator 32 to the count (C) input of error counter 34. The number of pulses in the group delivered to counter 34 in response to the enabling of gate 30 will be commensurate with the width of the input pulses and these pulses will be delivered to the error counter subsequent to the clearing of the counter by a strobe pulse.

The gated pulses will be added to the complement of the count stored in up-down counter 50 in error counter 34. Up-down counter 50 will initially be cleared and thus a signal commensurate with the capacity of counter 50 will be compared with the gated pulses immediately after receipt of a control variable error signal. As previously noted, the last of the gated pulses which fills error counter 34 will cause the output of NAND-gate 64 to go to zero. Accordingly, if the sum of the complement of the count transferred from counter 50 and the pulses passed by gate 30 fails to fill counter 34, the output of gate 64 will remain at the "one" state whereas overflow of counter 34 will cause the output of NAND-gate 64 to go to zero and to thereafter return to its static "one" state. If NAND-gate 64 goes to zero, one bit memory multivibrator 40, which will be set by a synchronization pulse from multivibrator 38, will be reset. Also, a zero output from NAND-gate 64 will cause the resetting of RST-multivibrator 46. If error counter 34 overflows, an additional NAND-gate 66 will function as an inverter and will cause resetting of multivibrator 46.

In the manner described above, a clock pulse will be generated by multivibrator 44 a short time after the input pulse terminates. The delay in application of a clock pulse, as established by delay multivibrator circuit 44, is sufficient to permit completion of the operation of error counter 34. The clock pulses will cause the transfer of the information appearing at the inputs of RST-multivibrators 46 and 48 to the outputs of these circuits. Restated, through the operation of NAND-gates 64 and 66 and memory circuit 40, static information is presented at the set and reset terminals of RST-multivibrators 46 and 48 and this static information will be applied to the proper output terminals of the multivibrators upon the generation of a clock pulse by one shot multivibrator 44.

The information appearing at the inputs to RST-multivibrators 46 and 48 will be indicative of whether error counter 34 has overflowed, counted to its capacity or not been filled by the total of the gated pulses and the complement of the information previously stored in up-down counter 50. Thus, multivibrator 40 remembers whether error counter 34 has been filled or overflowed since this circuit will have been preset by a zero signal appearing at the output of NAND-gate 64. Restated, the Q output of circuit 40 will be zero if counter 34 is counted to its capacity or overflowed whereas a zero signal will appear at the $\bar{Q}$ output of circuit 40 if counter 34 is not counted to its capacity. The state of circuit 40 will, upon the generation of a clock pulse, be transferred to the output of circuit 48 whereby the appearance of a zero at the Q output of multivibrator 48 will indicate that counter 34 has not been counted to its capacity, this in turn being an indication that the step motor should be repositioned in the "up" direction. Similarly, the appearance of a zero at the $\bar{Q}$ output of circuit 48 will be indicative of the fact that counter 34 has counted to its capacity or overflowed and that motor 16 should thus be stepped in the "down" direction. Since the $\bar{Q}$ output of RST-multivibrator 48 is connected to the "down" input of up-down counter 50, the appearance of a zero signal on this output will cause proportional pulses applied to counter 50 from gate 54 to be subtracted from any count previously stored therein. The $\bar{Q}$ output from circuit 48 is applied, via gate 49, to a NAND-gate 80 in logic circuit 56 and enables this gate. For the reasons to be discussed below, gate 49 will pass a signal to the logic circuit 56 only when gate 54 is passing proportional pulses to the motor. The enabling of gate 80 will permit passage of input sign information to translator 60 in inverted form indicative of a need to reposition motor 16 in the "-down" direction; inversion of the input sign information being accomplished by serial application thereof to NAND-gate 82, 80 and 84 in circuit 56. Gate 86 of logic circuit 56 is enabled by the appearance of a zero at the Q output of RST-multivibrator 48, presuming enabling of gate 51 by proportional pulses passed by gate 54, and the input sign information will be serially passed through gates 86 and 84 and thus will not be inverted prior to application to the translator 60. Accordingly, with a zero output at the Q output terminal of multivibrator 48, any pulses delivered to motor 16 will cause the motor to step in the "up" direction.

Since only the $\overline{Q}$ output of RST-multivibrator 46 is employed, it may be seen that a zero signal will be applied to first inputs of NAND-gates 52 and 54 only when error counter 34 is full. Accordingly, NAND-gate 64 is driven to the zero level thus setting RST-multivibrator 46 only when the motor 16 should be stopped. The appearance of a zero signal at the $\overline{Q}$ output of circuit 46 will inhibit gates 52 and 54 thus preventing delivery of proportional pulses from ring counter 90 to translator 60. At all other times, that is when error counter 34 is either not counted to capacity or has overflowed, a "one" signal will appear at the $\overline{Q}$ output of multivibrator 46 and gate 54 will be enabled. As previously noted, the enabling of gate 54 will cause the application of proportional pulses to the count input of up-down counter 50 and also to translator 60 via gate 20.

After receipt of the first input pulse commensurate with a control variable error, the proportional logic circuitry will operate as described above to enable gate 54 and directional control logic circuit 56 in such a manner that pulses from ring counter 90 will be furnished to translator 60 and step motor 16 will be rapidly stepped in the proper direction so as to null the control variable error as, for example, by increasing or decreasing fuel flow to a gas turbine engine. A signal commensurate with the position to which motor 16 has been stepped will be stored in up-down counter 50. Upon receipt of the next input pulse, the complement of the position (or initial control variable error) information stored in up-down counter 50 will be compared with the new or instantaneous control variable error and, if necessary, additional proportional pulses will be gated to translator 60. In the foregoing manner, upon receipt of a pulse width modulated input signal commensurate with a control variable error, the present invention will cause step motor 16 to be rapidly repositioned so as to null any error.

In order to provide for steady state speed correction, the step motor output shaft position information stored in up-down counter 50 is employed to enable one or more of gates 70–76 in integral logic circuit 18 so as to thereby deliver pulses to translator 60 at a rate which is proportional to the position of motor 16. The net output signals from logic circuit 18 are, accordingly, commensurate with the integral of the proportional position. As previously noted, the width of the output pulses of frequency divider circuit 78 are constrained such that the pulses are the various frequency divider output frequencies may be interleaved. The integral pulses delivered to the gating circuit 20 from integral logic circuit 18, as a result of the enabling of some of gates 70–76, will also be spaced in time such that the integral pulses will occur between pairs of proportional pulses. The pulse train appearing at the output of gate 20, said pulse train resulting from the interleaving of integral pulses provided by frequency divider 78 and the generation of these integral pulses in the intervals between pairs of proportional pulses, will be applied to translator 60 and thence to step motor 16. It is to be noted that no record is kept of the repositioning of the output shaft of motor 16 as commanded by the integral pulses since the integral pulses are not applied to up-down counter 50. Accordingly, up-down counter 50 keeps track of only the proportional position of the motor. It is also to be noted that directional control logic circuit 56, as a result of the action of gates 49 and 51, cannot affect the directional information applied to translator 60 during intervals when integral pulses are being delivered to the translator. That is, proportional sign information as provided at the $\overline{Q}$ and Q outputs of multivibrator 48 will be applied to respective gates 80 and 86 in logic circuit 56 only when gates 49 and 51 are enabled by proportional pulses passed by gate 54. This results in the input sign information being passed to translator 60 in unaltered form during intervals when integral pulses may occur and the integral pulses will cause motor 16 to step in the proper direction to null the actual control variable error.

Since the rate at which the integral pulses are applied to motor 16 is a function of the totalized number of proportional counts delivered to the motor, the integral logic circuit will continue to operate to reduce the control variable error to zero until such time as the count in up-down counter 50 has been reduced to zero. Thus, in operation, the proportional control will rapidly null the control variable error to the degree possible within the capabilities of the proportional system. Since the proportional control must operate along the droop line of the engine and control, there will inherently be a small residual control variable (speed) error when the proportional control has made its correction. The supplementary integral loop will deliver pulses to the motor at a relatively low frequency and at a rate which is a function of the proportional position as stored in counter 50. The integral pulses will cause the motor to step in the proper direction to eliminate the residual speed error. Since the integral pulses are not counted, the delivery thereof to motor 16 will cause the proportional control to continue to operate until the integral control commands step motor 16 to a new steady-state position commensurate with zero control variable error and also until the number in up-down counter 50 has been reduced to zero. Thus, it may be seen that the control system of the present invention does not actually know the position of the output draft of step motor 16 and the control is accordingly purely an open-loop servo.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:

1. In a digital proportional servosystem, said system including means for generating and delivering to an actuator a number of first frequency pulses commensurate with the magnitude of a control variable error, the improvement comprising:

counter means for totalizing the number of proportional pulses delivered to the actuator;

means for generating a plurality of pulse signals at frequencies differing from the proportional pulse frequency;

gate means connected to said means for generating a plurality of pulse signals and to said counter means, said gate means being responsive to the number stored in said counter means whereby the number of said signals at different frequencies passed by said gate means will be determined by the totalized number of proportional pulses; and means for delivering the signals passed by said gate means to the actuator means.

2. The apparatus of claim 1 wherein said means for generating a plurality of pulse signals at differing frequencies comprises:

means for generating pulses at a second frequency, said second frequency being lower than said first frequency, said second frequency pulses being shifted in phase with respect to said first frequency pulses; and frequency divider means responsive to said second frequency pulses for generating a plurality of pulsating output signals at frequencies less than said first frequency, said frequency divider output signals being constrained to pulse widths which permit interleaving of the signals at the various frequencies.

3. The apparatus of claim 2 wherein said gate means comprises:

a plurality of gating circuits, the control input of each of said gating circuits being connected to respective stages of said proportional count totalizing counter means.

4. A digital servosystem comprising:

pulse generator means for generating proportional pulses at a first frequency and a plurality of pulsating signals at frequencies lower than said first frequency;

means for delivering said proportional pulses and selected of said plurality of lower frequency signals to an actuator;

counter means for totalizing the proportional pulses transmitted to the actuator;

means responsive to input signals commensurate with a control variable error for generating a digital signal commensurate therewith;

comparator means connected to said means for generating the digital control variable error signal and to said counter means, said comparator means being responsive to the count stored in said counter means and to said signal commensurate with control variable error for providing control signals;

means connected to said comparator means and responsive to said control signals for generating gating signals indicative of the sign of the control variable error;

first gate means connected between said pulse generator means and said delivering means, said first gate means further being connected to gating signal generating means and to said counter means and being responsive to said signals indicative of sign of the error for controlling application of said proportional pulses to said delivering means and to said counter means; and second gate means connected between said pulse generator means and said delivery means, said second gate means further being connected to said counter means and being responsive to the count in said counter means for selecting signals at said lower frequencies for application to said delivery means, the pulses passed by said second gate means being delivered to the actuator at a rate commensurate with the totalized proportional count.

5. The apparatus of claim 4 wherein said pulse generator means comprises:

means for generating pulses at a frequency higher than said first frequency; and frequency divider means responsive to said higher frequency pulses for generating proportional pulses at said first frequency and pulses at a plurality of frequencies lower than said first frequency.

6. The apparatus of claim 5 wherein said frequency divider means comprises:

means responsive to said higher frequency pulses for generating said first frequency proportional pulses and pulses at a third frequency, said third frequency being less than said first frequency and said third frequency pulses being displaced in phase with relation to said first frequency pulses; and a frequency divider circuit responsive to said third frequency pulses for generating a plurality of pulsating signals at frequencies less than said first frequency.

7. The apparatus of claim 4 wherein said second gate means comprises:

a plurality of gating circuits, the control input of each of said gating circuits being connected to a respective stage of said proportional count totalizing counter means, each of said gating circuits further being connected to receive one of said plurality of pulsating signals.

8. The apparatus of claim 7 further comprising:

means responsive to said signals indicative of sign for generating proportional direction control signals for the actuator; and means connected to the output of said gating signal generating means and to said first gate means and responsive to proportional counts passed by said first gate means for preventing application of said signals indicative of sign to said direction control signal generating means in the absence of proportional pulses being delivered to the actuator.

* * * * *